(12) United States Patent
Lin

(10) Patent No.: US 9,141,464 B2
(45) Date of Patent: Sep. 22, 2015

(54) COMPUTING DEVICE AND METHOD FOR PROCESSING SYSTEM EVENTS OF COMPUTING DEVICE

(71) Applicant: ShenZhen Treasure City Technology Co., LTD., ShenZhen (CN)

(72) Inventor: Chien-Liang Lin, New Taipei (TW)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 312 days.

(21) Appl. No.: 13/894,451

(22) Filed: May 15, 2013

(65) Prior Publication Data

US 2013/0339780 A1    Dec. 19, 2013

(30) Foreign Application Priority Data

Jun. 13, 2012    (TW) ................................. 101120997

(51) Int. Cl.
*G06F 11/30*    (2006.01)
*G06F 11/07*    (2006.01)
*G06F 11/14*    (2006.01)

(52) U.S. Cl.
CPC ........ *G06F 11/0793* (2013.01); *G06F 11/0706* (2013.01); *G06F 11/0787* (2013.01); *G06F 11/1417* (2013.01)

(58) Field of Classification Search
CPC ............ G06F 11/1443; G06F 11/0706; G06F 11/0766; G06F 11/0787
USPC .......................................................... 714/36
See application file for complete search history.

(56) References Cited

U.S. PATENT DOCUMENTS

| | | | |
|---|---|---|---|
| 2006/0168189 A1* | 7/2006 | Huang | 709/223 |
| 2007/0234123 A1* | 10/2007 | Shih et al. | 714/36 |
| 2008/0046546 A1* | 2/2008 | Parmar et al. | 709/220 |
| 2008/0059784 A1* | 3/2008 | Fu | 713/2 |
| 2008/0126852 A1* | 5/2008 | Brandyberry et al. | 714/8 |
| 2009/0025008 A1* | 1/2009 | Hung | 719/312 |
| 2009/0089624 A1* | 4/2009 | Austen et al. | 714/39 |
| 2012/0011355 A1* | 1/2012 | Tang | 713/100 |
| 2012/0166605 A1* | 6/2012 | Chou | 709/223 |

* cited by examiner

*Primary Examiner* — Chae Ko
(74) *Attorney, Agent, or Firm* — Novak Druce Connolly Bove + Quigg LLP

(57) ABSTRACT

In a method for processing system events of a computing device, the computing device includes a basic input and output system (BIOS) and a baseboard management controller (BMC). The method allocates revised storage blocks in the BMC, for storing normal system events of the computing device, and a backup storage block in the BMC for storing error system events of the computing device. The method detects a error system event via the BMC, and records the error system event into the backup storage block of the BMC. The method obtains the error system event from the backup storage block of the BMC via the BIOS when the computing device is rebooted, and processes the error system event to reboot the computing device using a normal system event stored in the revised storage blocks of the BMC.

18 Claims, 5 Drawing Sheets

COMPUTING DEVICE AND METHOD FOR PROCESSING SYSTEM EVENTS OF COMPUTING DEVICE

BACKGROUND

1. Technical Field

Embodiments of the present disclosure relate to systems and methods for processing system events of computing devices, and particularly to a computing device and a method for processing system events of the computing device.

2. Description of Related Art

It is known in the art that a computing device (e.g., a computer or a server) generates multiple system events during normal operation of the computing device. Each of the system events detects and records if various components (e.g., a CPU, a fan, a memory, or a power supply) of the computing device work normally. If a component (e.g., the memory) of the computing device malfunctions, an error system event may be generated immediately and recorded into a baseboard management controller (BMC) of a motherboard. In general, the error system event may be processed by a basic input and output system (BIOS) when the computing device is rebooted. However, it costs time for the BIOS to check all system events recorded in the BMC when processing the error system event, and thus increases booting time of the computing device. Therefore, there is room for improvement within the prior art.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of a non-transitory computer-readable medium include CDs, DVDs, flash memory, and hard disk drives.

Figure 1:
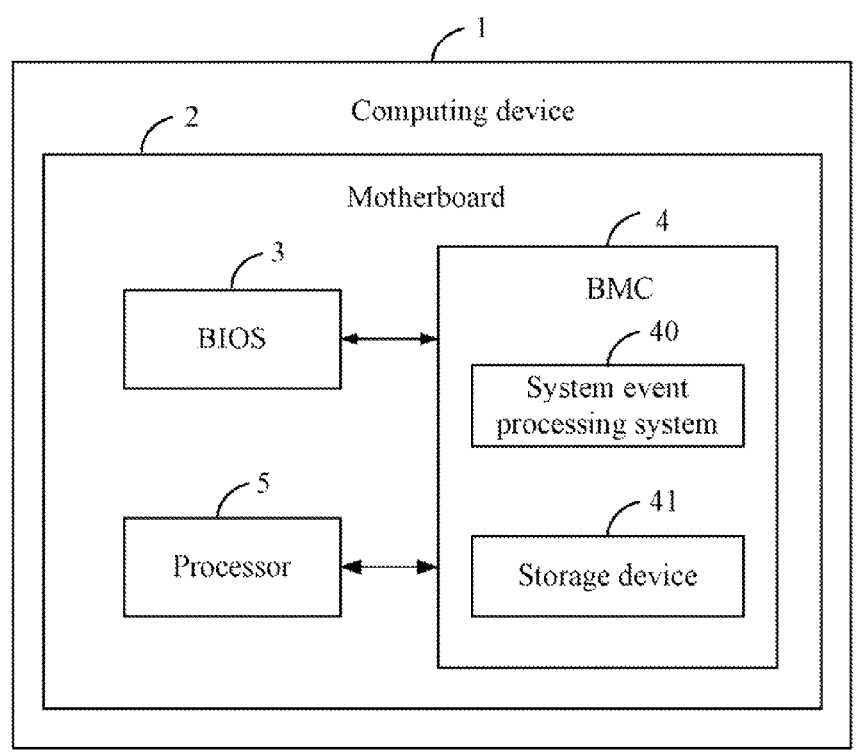
FIG. 1 is a block diagram of one embodiment of a computing device including a system event processing system.

FIG. 1 is a block diagram of one embodiment of a computing device 1 including a system event processing system 40. In the embodiment, the computing device 1 includes a motherboard 2, which includes a basic input and output system (BIOS), a baseboard management controller (BMC) 4, and at least one processor 5. The BMC 4 includes a storage device 41 that stores the system event processing system 40. In one embodiment, the system event processing system 40 may include computerized instructions in the form of one or more programs that are stored in the storage device 41 and executed by the at least one processor 5. The computing device 1 may be a personal computer (PC), a tablet, a notebook, or a server, for example. FIG. 1 illustrates only one example of the computing device 1, other examples may include more or fewer components than illustrated, or have a different configuration of the various components in other embodiments.

The BIOS 3 is stored in a memory such as a read-only memory (ROM), or an electronically erasable-programmable read-only memory (EEPROM). The BMC 4 detects if a component (e.g., a CPU, a fan, a memory, or a power supply) of the computing device 1 works normally, and records all system events generated by the computing device 1 into the storage device 41. In one embodiment, the storage device 41 may be an internal storage system, such as a random access memory (RAM) for temporary storage of information, and/or a read only memory (ROM) for permanent storage of information. The processor 5 is a central processing unit (CPU) or microprocessor that performs various functions of the computing device 1.

In the embodiment, if a component (e.g., the memory) of the computing device 1 malfunctions, an error system event may be generated immediately and recorded into the storage device 41 of the BMC 4. The error system event is a system event indicating that the component of the computing device 1 occurs a multi-bit (e.g., 8 bits) error. The error system event is obtained from the BMC 4 and processed by the BIOS 3 when the computing device 1 reboots.

Figure 2:
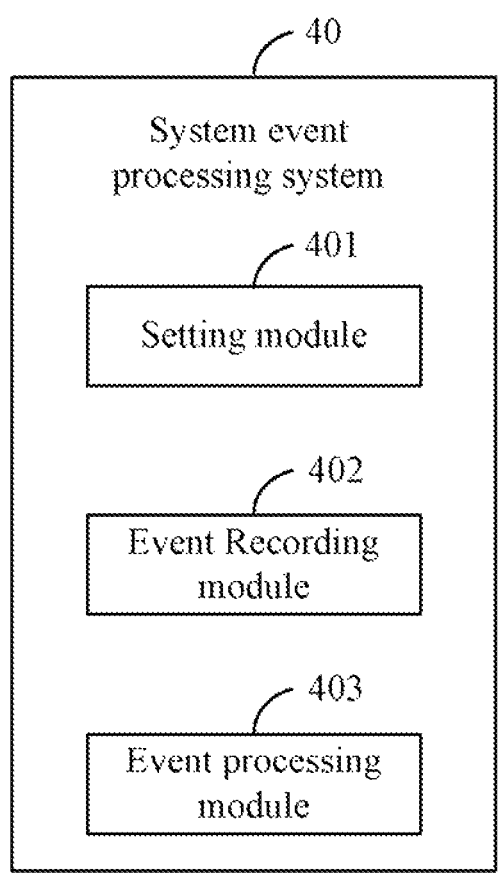
FIG. 2 is a block diagram illustrating function modules of the system event processing system in FIG. 1.

FIG. 2 is a block diagram illustrating function modules of the system event processing system 40. In one embodiment, the system event processing system 40 includes a setting module 401, an event recording module 402, and an event processing module 403. The modules 401-403 may comprise computerized instructions in the form of one or more programs that are stored in the storage device 40 and executed by the at least one processor 5. A detailed description of each module will be given in the following paragraphs.

The setting module 401 is configured to allocate a revised storage block in the storage device 41 for storing normal system events of the computing device 1, and allocate a backup storage block in the storage device 41 for storing error system events of the computing device 1. In the embodiment, the normal system events indicate that the computing device 1 works normally, and the error system events the computing device 1 works abnormally. For example, if a component (e.g., the memory) of the computing device 1 malfunctions, the computing device 1 generates an error system event indicating that the computing device 1 has a multi-bit error concerning the memory.

Figure 3:
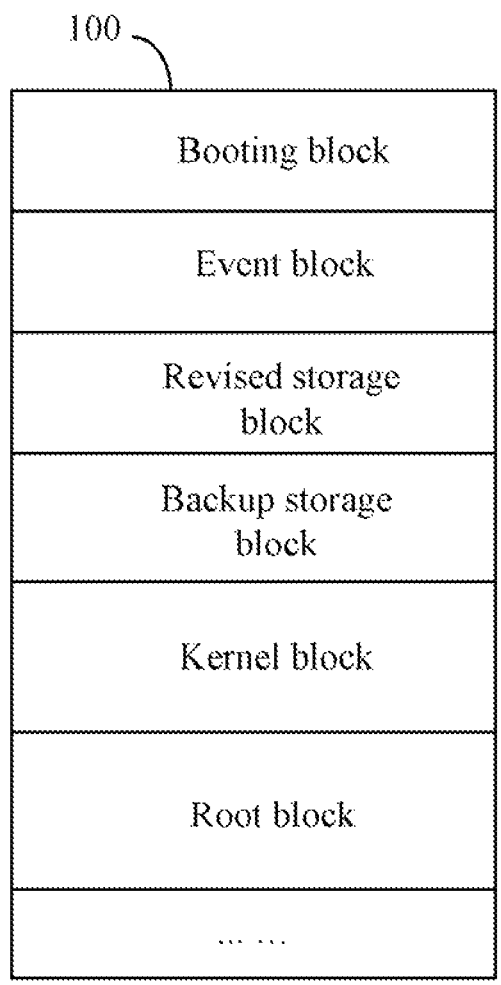
FIG. 3 shows one exemplary embodiment of storage blocks in a storage device of a baseboard management controller (BMC).

FIG. 3 shows one exemplary embodiment of storage blocks in the storage device 40. In the embodiment, the storage device 41 is partitioned into a plurality of storage blocks. The storage blocks may include a booting block, an event block, a revised storage block, a backup storage block, a kernel block and a root block. If the storage device 41 is a serial peripheral interface (SPI) FLASH memory 100 having 16 megabytes (Mbytes) of storage, the storage space of the revised storage block may be 2 Mbytes, and the storage space of the backup storage block may be 2 Mbytes. The booting block stores data for booting the computing device 1, the event block stores all the system events of the computing device 1, the kernel block stores kernel codes of the system events, and the root block stores root files of the computing device 1.

Figure 4:
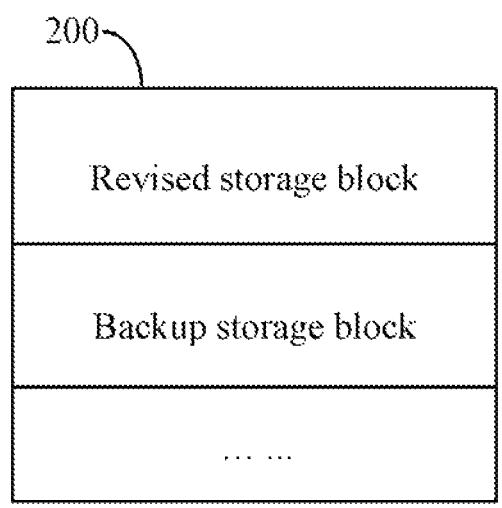
FIG. 4 shows another exemplary embodiment of storage blocks in the storage device of the BMC.

FIG. 4 shows another exemplary embodiment of storage blocks in the storage device 40. In this embodiment, the storage device 41 is an EEPROM 200 having 32 Mbytes. The storage space of the revised storage block may be 4 Mbytes, and the storage space of the backup storage block may be 4 Mbytes. The revised storage block stores error system events of the computing device 1, and the backup storage block stores backup data of the error system events.

The event recording module 402 is configured to detect whether a component of the computing device 1 occurs an error system event via the BMC 4, and record the error system event into the backup storage block of the storage device 41 when the BIOS 3 sends an intelligent platform management interface (IPMI) command to the BMC 4. In the embodiment, the error system event may indicate a multi-bit error from the memory of the computing device 1. The BIOS sends the IPMI command to the BMC 4 to request the BMC 4 to record the error system event when an error system event occurs.

The event processing module 403 is configured to obtain the error system event from the backup storage block of the storage device 41 via the BIOS 3 when the computing device 1 is rebooted, and processing the error system event to reboot the computing device 1 using a normal system event stored in the revised storage block of the storage device 41. The normal system event corresponds to the error system event recorded in the backup storage block of the storage device 41.

Figure 5:
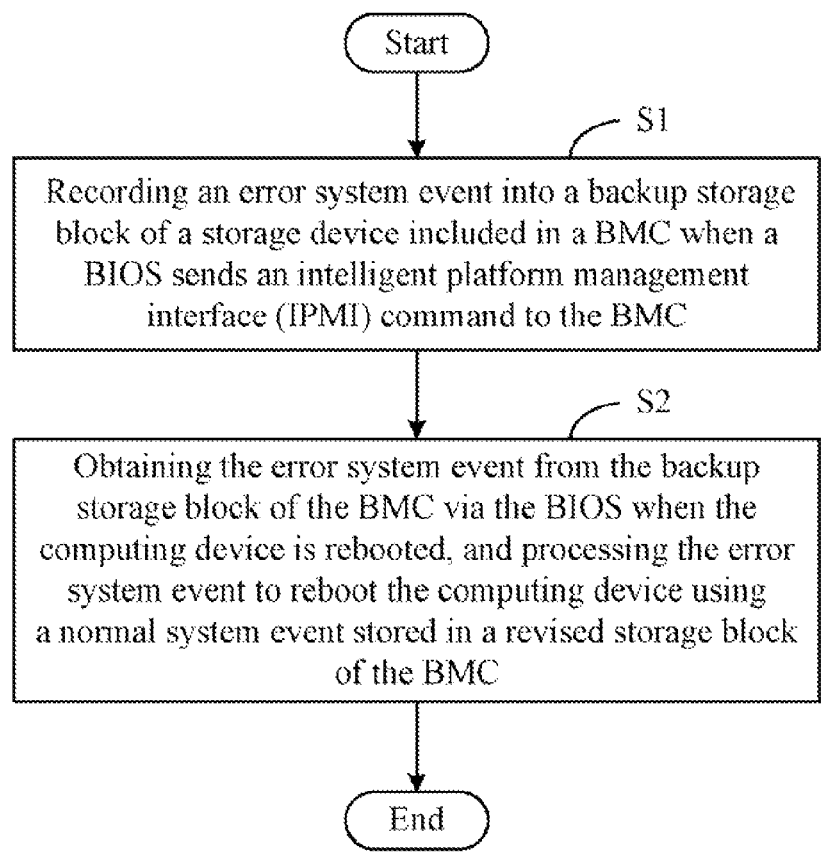
FIG. 5 is a flowchart of one embodiment of a method for processing system events of the computing device in FIG. 1.

FIG. 5 is a flowchart of one embodiment of a method for processing system events of the computing device 1 in FIG. 1. The method is performed by execution of a computer-readable program code or instructions by the at least one processor 5 of the computing device 1. Depending on the embodiment, additional steps may be added, others removed, and the ordering of the steps may be changed.

Before implementing step S1, the setting module 401 allocates a revised storage block in the storage device 41 for storing normal system events of the computing device 1, and allocates a backup storage block in the storage device 41 for storing error system events of the computing device 1. In one example with respect to FIG. 5, the storage device 41 (e.g., the EEPROM 200) is partitioned into a plurality of storage blocks, which includes the revised storage block and the backup storage block.

In step S1, the event recording module 402 detects if a component of the computing device 1 occurs an error system event via the BMC 4, and records the error system event into the backup storage block of the storage device 41 when the BIOS 3 sends an intelligent platform management interface (IPMI) command to the BMC 4. In the embodiment, the error system event may indicate that a multi-bit error has occurred in the memory of the computing device 1. The BIOS sends the IPMI command to the BMC 4 to request the BMC 4 to record the error system event when the error system event occurs in the computing device 1.

In step S2, the event processing module 403 obtains the error system event from the backup storage block of the storage device 41 via the BIOS 3 when the computing device 1 is rebooted, and processes the error system event to reboot the computing device 1 using a normal system event stored in the revised storage block of the storage device 41. The normal system event corresponds to the error system event recorded in the backup storage block of the storage device 41.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
    a basic input and output system (BIOS);
    a baseboard management controller (BMC);
    at least one processor; and
    a storage device storing one or more computer-readable programs, which when executed by the at least one processor, causes the at least one processor to:
    allocate a revised storage block in the BMC that stores normal system events of the computing device, and allocate a backup storage block in the BMC that stores error system events of the computing device;
    detect if the computing device generates an error system event via the BMC, and record the error system event into the backup storage block of the BMC when the BIOS sends an intelligent platform management interface (IPMI) command to the BMC; and
    obtain the error system event from the backup storage block of the BMC via the BIOS when the computing device reboots, and reboot the computing device using a normal system event stored in the revised storage block of the BMC.

2. The computing device according to claim 1, wherein the error system event is a system event indicating that a multi-bit error has occurred in a component of the computing device.

3. The computing device according to claim 1, wherein the normal system event is a system event indicating that the computing device works normally.

4. The computing device according to claim 1, wherein the storage device is included in the BMC, and is a serial peripheral interface (SPI) FLASH memory or an electronically erasable-programmable read-only memory (EEPROM).

5. The computing device according to claim 4, wherein the storage device is partitioned a plurality of storage blocks comprising the revised storage block and the backup storage block.

6. The computing device according to claim 5, wherein the storage blocks further includes a booting block, an event block, a kernel block and a root block.

7. A method for processing system events of a computing device, the computing device comprising a basic input and output system (BIOS) and a baseboard management controller (BMC), the method comprising:
    allocating a revised storage block in the BMC that stores normal system events of the computing device, and allocating a backup storage block in the BMC that stores error system events of the computing device;
    detecting if the computing device generates an error system event via the BMC, and recording the error system event into the backup storage block of the BMC when the BIOS sends an intelligent platform management interface (IPMI) command to the BMC; and
    obtaining the error system event from the backup storage block of the BMC via the BIOS when the computing device is rebooted, and rebooting the computing device using a normal system events stored in the revised storage block of the BMC.

8. The method according to claim 7, wherein the error system event is a system event indicating that a multi-bit error has occurred in a component of the computing device.

9. The method according to claim 7, wherein the normal system event is a system event indicating that the computing device works normally.

10. The method according to claim 7, wherein the BMC includes a storage device that is a serial peripheral interface (SPI) FLASH memory or an electronically erasable-programmable read-only memory (EEPROM).

11. The method according to claim 10, wherein the storage device is partitioned a plurality of storage blocks comprising the revised storage block and the backup storage block.

12. The method according to claim 11, wherein the storage blocks further includes a booting block, an event block, a kernel block and a root block.

13. A non-transitory storage medium having stored thereon instructions that, when executed by at least one processor of a computing device, cause the processor to perform a method for processing system events of the computing device, the computing device comprising a basic input and output system (BIOS) and a baseboard management controller (BMC), the method comprising:

allocating a revised storage block in the BMC that stores normal system events of the computing device, and allocating a backup storage block in the BMC that stores error system events of the computing device;

detecting if the computing device generates an error system event via the BMC, and recording the error system event into the backup storage block of the BMC when the BIOS sends an intelligent platform management interface (IPMI) command to the BMC; and obtaining the error system event from the backup storage block of the BMC via the BIOS when the computing device is rebooted, and rebooting the computing device using a normal system event stored in the revised storage block of the BMC.

14. The storage medium according to claim 13, wherein the error system event is a system event indicating that a multi-bit error has occurred in a component of the computing device.

15. The storage medium according to claim 13, wherein the normal system event is a system event indicating that the computing device works normally.

16. The storage medium according to claim 13, wherein the BMC includes a storage device that is a serial peripheral interface (SPI) FLASH memory or an electronically erasable-programmable read-only memory (EEPROM).

17. The storage medium according to claim 16, wherein the storage device is partitioned a plurality of storage blocks comprising the revised storage block and the backup storage block.

18. The storage medium according to claim 17, wherein the storage blocks further includes a booting block, an event block, a kernel block and a root block.

* * * * *